United States Patent [19]

Perry

[11] Patent Number: 4,771,968

[45] Date of Patent: Sep. 20, 1988

[54] MODEL AIRPLANE ENGINE MOUNT

[76] Inventor: John C. Perry, 3170 Falcon Dr., Carlsbad, Calif. 92008

[21] Appl. No.: 922,183

[22] Filed: Oct. 23, 1986

[51] Int. Cl.$^4$ ............................................. B64D 27/00
[52] U.S. Cl. ...................................................... 244/54
[58] Field of Search ................ 244/54, 53 R; 446/57, 446/58; 248/554

[56] References Cited

U.S. PATENT DOCUMENTS

| | | | |
|---|---|---|---|
| 1,705,492 | 3/1929 | Noble | 248/554 |
| 2,047,963 | 7/1936 | Hoffman | 244/54 |
| 2,377,006 | 5/1945 | Heinemann et al. | 248/554 |
| 2,395,143 | 2/1946 | Prewitt | 244/54 |
| 2,589,539 | 3/1952 | Childress | 244/54 |
| 3,059,879 | 10/1962 | Tatone | 244/54 |
| 4,249,711 | 2/1981 | Godbersen | 244/54 |

Primary Examiner—Galen Barefoot
Attorney, Agent, or Firm—Donald R. Nyhagen

[57] ABSTRACT

An improved engine mount for model airplanes which significantly increases usable engine power by reducing engine oscillation and thereby also engine power loss due to such oscillation and which greatly facilitates installation and removal of the engine. The mount comprises a relatively stiff mounting block substantially coaxial with the engine crankshaft rotation axis and extending between and rigidly secured to the rear end of the engine crankcase and an engine mounting wall or the like on the airplane at the rear of the engine. The preferred engine mount has a generally cylindrical spool-like shape with front and rear end flanges containing holes to receive screws for securing the mount to the engine and engine mounting wall.

9 Claims, 2 Drawing Sheets

MODEL AIRPLANE ENGINE MOUNT

BACKGROUND OF THE INVENTION

1. Field

This invention relates generally to model airplanes and more particularly to an improved model airplane engine mount which increases usable engine power and facilitates engine installation and removal.

2. Prior Art

A model airplane engine is commonly attached to the front firewall of the airplane fuselage by an engine mount. The most widely used mount at the present time is a beam-type mount having a rear mounting base which seats against and is secured to the firewall and a pair of engine support beams extending forwardly from the mounting base. These beams are spaced to straddle the lower crankcase portion of the engine, and have upwardly facing longitudinal surfaces for seating laterally projecting mounting lugs on the engine. The engine is secured to the beams by screws extending through the engine lugs into the beams.

This beam-type of engine mount has two disadvantages. Its most significant disadvantage resides in the fact that the engine undergoes substantial oscillatory motion in a plane normal to the engine crankshaft rotation axis. This oscillation consumes a significant portion of the engine power and thus reduces the usable engine power delivered to the propeller.

It is believed that the construction of the existing beam mount permits, if not promotes, this power consuming oscillation of the engine. Thus, the engine supporting beams of the engine mount, while relatively stiff, are never-the-less flexible to some degree and extend a substantial distance forwardly along the engine in laterally offset relation to the engine crankshaft rotation axis. It is believed that these forwardly extending beams permit, if not actually promote, engine oscillation.

Another disadvantage of the existing beam mount is that the engine is secured to the mount by screws which extend through holes the engine side mounting lugs into the mounting beams. These screws are very difficult to reach, remove, and later replace. As a consequence, removal and replacement of the engine is relatively difficult and time consuming. Accordingly, a definite need exists for an improved model airplane engine mount.

SUMMARY

This invention provides such an improved engine mount. Simply stated, the engine mount comprises a relatively stiff engine mounting block to be secured to the rear side of the engine, preferably substantially coaxially with the crankshaft rotation axis, and means for securing the mounting block to the engine and airplane fire wall.

The presently preferred engine mount of the invention comprises a stubby generally cylindrical spool-like block with attachment or mounting flanges at each end. These flanges contain screw holes to receive screws for attaching the flanges to the rear end of the engine crankcase and the airplane fire wall. Unlike the existing beam-type engine mount, the preferred engine mount is substantially coaxial along its entire length with the engine crankshaft axis and is situated entirely within the relatively narrow space between the engine and the airplane fire wall.

This improved engine mount significantly reduces engine oscillation in a plane normal to its crankshaft rotation axis and thereby reduces engine power loss due to such oscillation and increases useful engine power. Accordingly, to another feature of the invention, the mounting screws of the engine mount are readily accessable for removal and replacement of the engine.

BRIEF DESCRIPTION OF THE DRAWINGS

FIG. 3 is an enlarged perspective view of the improved engine mount.

PREFERRED EMBODIMENT

Figure 1:
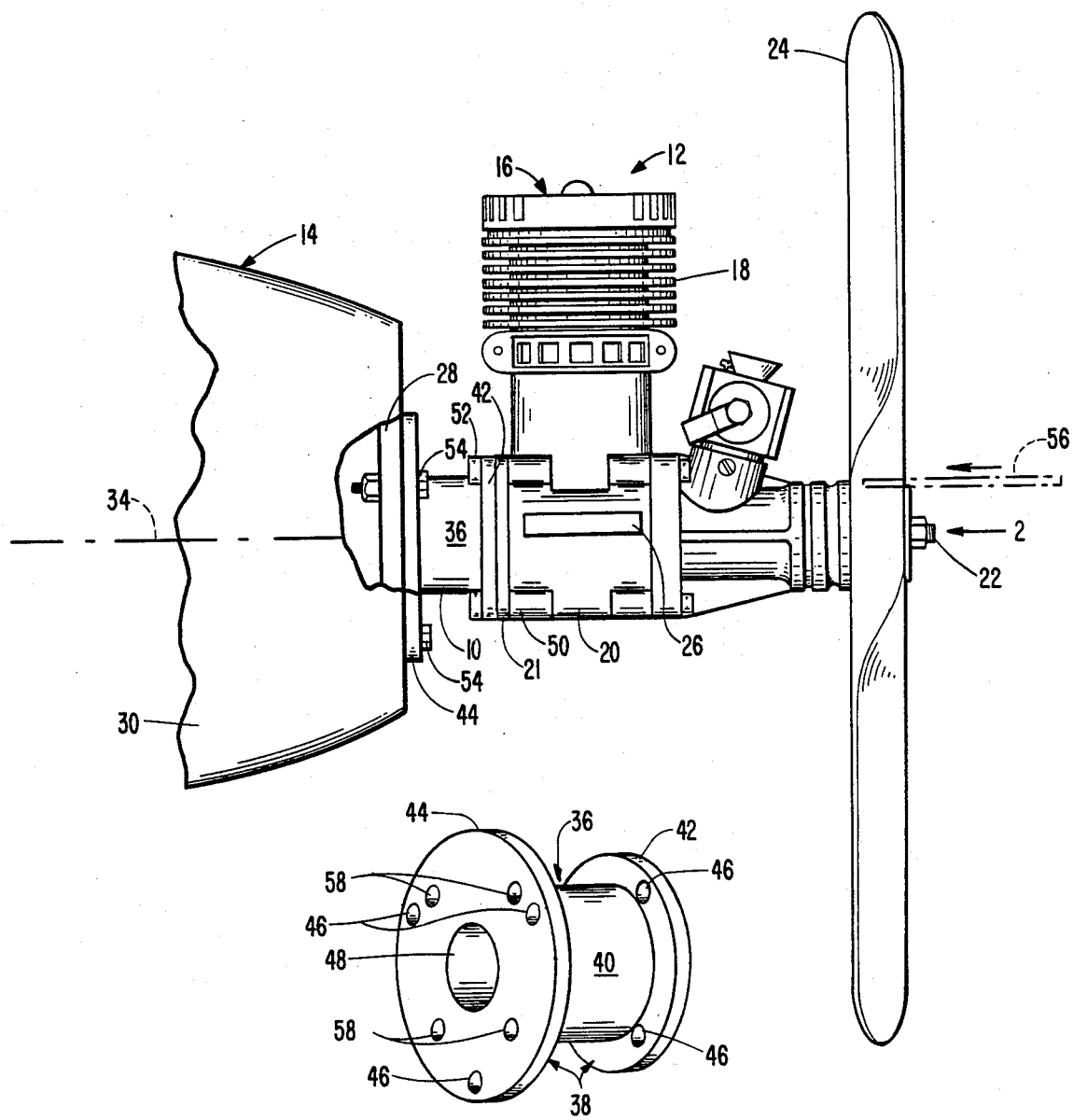
FIG. 1 illustrates an improved model airplane engine mount according to the invention supporting an engine on an airplane firewall.
Figure 2:
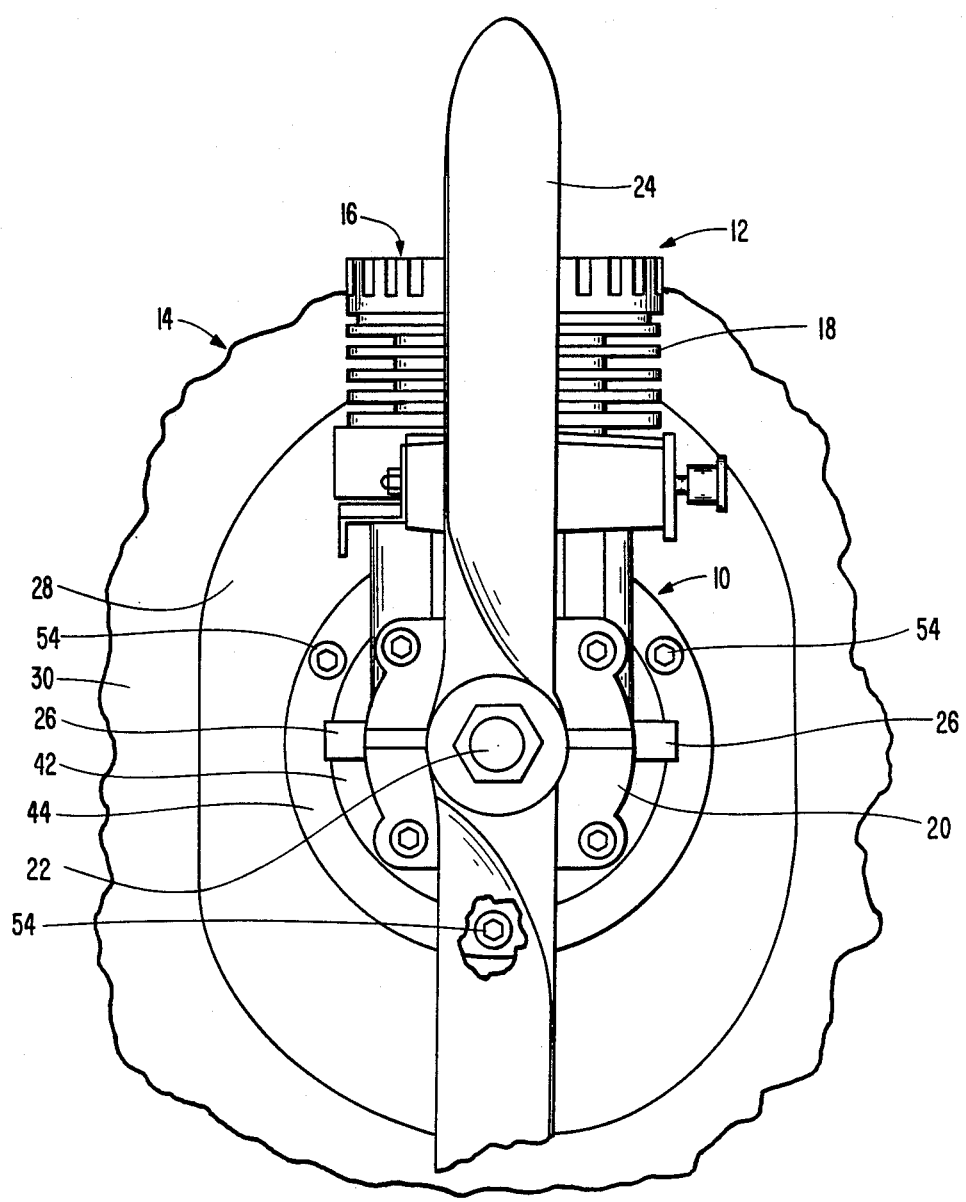
FIG. 2 is a enlarged view taken looking in the direction of the arrow 2 in FIG. 1.

Turning now to these drawings, there is illustrated an improved engine mount 10 in accordance with the invention, mounting a model engine 12 on the fuselage 14 of a model airplane. Both the engine and model airplane are conventional and hence need be described only in sufficient detail to enable a full and complete understanding of the invention.

With this in mind, the engine 12 is a typical two cycle model airplane engine. The engine has a body 16 including an upper, finned cylinder 18 and a lower crankcase 20. The rear end of the crankcase is closed by a removable cap 21. Rotatably, in the crankcase is a crankshaft 22. The front end of the crankshaft extends externally of the crankcase and mounts a propeller 24. Projecting from the sides of the crankcase in a common plane normal to the axis of the cylinder are a pair of rectangular mounting lugs 26. These are the mounting lugs mentioned earlier which are used to secure the engine to the existing beam-type engine mount. The lugs are not used with the present invention and may be eliminated, if desired.

The model airplane fuselage 14 has a front fire wall 28 joined about its perimeter to the fuselage skin 30. This fire wall is disposed in a plane normal to the longitudinal axis of the fuselage and typically comprises a piece of plywood for strength.

The improved engine mount 10 of the invention, like the existing beam-type engine mount, is designed to firmly mount the engine 12 on the airplane fire wall 28. The engine mount comprises a relatively stiff mounting block having attachment means 38, for rigidly securing the mounting block to the rear side of the engine, and the front side of the airplane fire wall 28 preferably in substantially coaxial relation to the engine axis 34.

The preferred engine mount 10 illustrated comprises a stubby cylindrical spool-like block having a central cylindrical portion 40 with integral coaxial circular mounting flanges 42, 44 at its ends in planes normal to the axis of the block. These flanges have screw holes 46 spaced around the flanges and together constitute the engine mount attachment means 38. For reasons explained below the rear mounting flange 44 is larger in diameter than the front mountng flange 42, and the screw holes 46 in the rear flange are radially spaced from the mounting block axis a greater distance than the diameter of the front mounting flange 42. While the engine mounting block may be solid in cross section, the illustrated block has a central opening 48 for reasons to be explained.

The front mounting flange 42 is secured to the rear end of the engine crankcase 20. To this end, the screws 52 which secure the rear cap 21 to bosses 50 at the rear end of the crankcase are removed, and the front mounting block flange 42 is placed against the rear side of the cap. The screw holes 46 in the front flange are located to register with the screw holes in the cap 21 and bosses 50 using the cap holes as a drill guide if desired. Screws 52 are then inserted through the front flange holes 46 into the engine bosses 50 to rigidly secure the mounting block 10 and the cap 21 to the engine. The rear mounting flange 44 is rigidly fixed to the airplane fire wall 28 by screws or bolts 54 which extend through the rear flange holes 46 and the fire wall.

When the engine 12 is thus mounted on the fire wall 28, the mounting block 10 extends between the engine and rear fire wall 28, in substantially coaxial relation along its entire length with the engine crankcase rotation axis 34. In contrast to the existing beam-type engine mount whose beams extend a substantial distance forwardly along the engine in offset relation to tis crankshaft axis, the entire improved engine mount is concentrically disposed relative to the engine axis and is situated entirely within the space between the engine and fire wall. This novel engine mount construction achieves the unique advantage of significantly reducing oscillation of the engine in a plane normal to the engine axis 34 and thereby engine power loss resulting from such oscillation. As a consequence, the useful engine power is significantly increased.

Another advantage of the improved engine mount 10 is the relative ease and speed with which the engine 12 can be mounted on and removed from the airplane. In this regard, it will be recalled that the rear mounting flange 44 is larger in diameter than the front flange 42 and the screw holes 46 in the rear flange are located radially out beyond the edge of the front flange. As a consequence, the engine 12 can be quickly and easily removed by engaging the rear flange screws 42 with a tool 56, such as a screw driver or Allen wrench, inserted into the screw heads from the front of the engine, as shown in the drawings. If necessary, the mount can then be removed from the engine by removing its front flange screws 52. To this end, the rear flange 44 has holes 58 aligned with the front flange holes 46 through which a screwdriver or Allen wrench may be inserted to remove the screws 52.

Yet another advantage of the improved engine mount is its simplicity, its light weight, and its ease of manufacture from metal or plastic. Preferably, the mount is injection molded from plastic.

As noted, the engine mount 10 has a central opening 48. This opening communicates to the engine crankcase and can be used to employ the crankcase pressure pulsations for some purpose.

I claim:

1. In combination:
   a model airplane having a front engine support,
   an engine forwardly of said support including a crankcase having a longitudinal axis, a rear end facing said support, an opposite front end, and a crankshaft within and rotatable on said axis of said crankcase and extending beyond said front end of said crankcase for connection to a propeller,
   a relatively rigid one-piece engine mounting block positioned on said axis between said engine support and crankcase, said mounting block having a rear end seating against said engine support and a front end seating against the rear end of said crankcase,
   rear screws extending through said mounting block substantially parallel to said axis and threaded in said engine support for securing the rear end of said block to said support,
   front screws extending through said mounting block substantially parallel to said axis and threaded in the rear end of said crankcase for securing the front end of said block to said engine,
   each rear screw having a head at its front end which is freely accessible by a tool extended rearwardly along the axis of the respective rear screw from beyond the front end of said crankcase for threading the screw into and from said engine support, and
   each front screw having a head at its rear end which is freely accessible by a tool extended forwardly along the axis of the respective front screw from beyond the rear end of said engine mounting block after removal of said engine and block from said engine support for threading the screw into and from said engine.

2. The combination of claim 1 wherein:
   said front screws are spaced a given radial distance from said axis for threaded engagement with the rear end of said engine crankcase, and
   said rear screws are spaced a greater radial distance from said axis to render the rear screws freely accessible from the front end of said crankcase.

3. The combination of claim 2 wherein:
   said crankcase includes a rear removable cap,
   the front end of said engine mounting block seats against said cap, and
   said front screws extend through said cap to secure both said engine mounting block and said cap to said crankcase.

4. The combination of claim 3 wherein:
   said engine mounting block has a generally spool-like shape an axially central portion and front and rear flanges at said front and rear ends, respectively, of said block projecting radially beyond said central portion and seating against said crankcase cap and said engine support, respectively, and
   said front and rear screws extend through said front and rear flanges, respectively.

5. The combination of claim 4 wherein:
   said central portion of said engine mounting block is cylindrical, and
   said rear flange has a larger radial dimension than said front flange to accomodate the larger radial spacing of said rear screws from said axis.

6. The combination of claim 1 wherein:
   said engine mounting block has a generally spool-like shape including an axially central portion and front and rear flanges at said front and rear ends, respectively, of said block projecting radially beyond said central portion and seating against said crankcase and said engine support, respectively, and
   said front and rear screws extend through said front and rear flanges, respectively.

7. The combination of claim 6 wherein:
   said central portion of said engine mounting block is cylindrical, and
   said rear flange has a larger radial dimension than said front flange to accomodate the larger radial spacing of said rear screws from said axis.

8. A model airplane engine mount for mounting a model airplane engine having a crankcase containing a crankshaft rotatable on a longitudinal axis of the crankcase on a model airplane engine support, comprising:
  a relatively rigid, one-piece spool-like block having a central axis, rear and front ends for seating against said engine support and the rear end of said engine crankcase, respectively, a central portion between said ends, and flange at said ends projecting radially out beyond said central portion,
  holes extending through said flanges parallel to said block axis to receive screws for securing said block to said engine crankcase and engine support, respectively, with said block axis substantially aligned with said crankcase axis, and wherein,
  the holes in said rear flange are spaced from said block axis a greater radial distance than the holes in said front flange, and said front flange does not obstruct any of said rear holes when the rear holes are viewed along their axis.

9. The engine mount of claim 8 wherein:
  said rear flange has holes coaxially aligned with the front flange holes to receive a tool for rotating screws extending through said front flange holes.

* * * * *